United States Patent
Wilson

[15] 3,654,470
[45] Apr. 4, 1972

[54] COMPENSATED DENSITY LOGGING SYSTEM HAVING A FILTER ONLY ON THE SHORT-SPACED DETECTOR

[72] Inventor: Billy F. Wilson, Houston, Tex.

[73] Assignee: Dresser Industries, Inc., Dallas, Tex.

[22] Filed: Dec. 9, 1969

[21] Appl. No.: 883,539

[52] U.S. Cl. ..................250/83.6 W, 250/86, 250/108 R
[51] Int. Cl. ..........................................G01v 5/00
[58] Field of Search .....................250/83.6 W, 108 R, 86

[56] References Cited

UNITED STATES PATENTS

| | | | |
|---|---|---|---|
| 2,761,977 | 9/1956 | McKay | 250/83.6 W |
| 3,038,075 | 6/1962 | Youmans | 250/83.6 W X |
| 3,321,625 | 5/1967 | Wahl | 250/83.6 W X |
| 3,521,063 | 7/1970 | Tittman | 250/83.6 W X |

Primary Examiner—Archie R. Borchelt
Attorney—Robert W. Mayer, Thomas P. Hubbard, Jr., Daniel Rubin, Raymond T. Majesko, Roy L. Van Winkle, William E. Johnson, Jr. and Eddie E. Scott

[57] ABSTRACT

A well logging instrument having a gamma ray source, a short-spaced gamma ray detector, and a long-spaced gamma ray detector is coupled through a logging cable to surface electronics. A cadmium filter is used to alter the response of the short-spaced detector. This filter causes the relationship between the counting rates measured by the long-spaced detector and the short-spaced detector as the mud cake thickness is varied to be a straight line rather than a curved line when plotted on log-log graph paper. Filters composed of tin, silver, copper, nickel or iron, individually or in combinations, may be used in place of cadmium. Such straight line relationships are useful in determining true formation densities from the two counting rates.

9 Claims, 9 Drawing Figures

INVENTOR
BILLY F. WILSON

Thomas P. Hubbard, Jr.

AGENT

INVENTOR
BILLY F. WILSON

COMPENSATED DENSITY LOGGING SYSTEM HAVING A FILTER ONLY ON THE SHORT-SPACED DETECTOR

BACKGROUND OF THE INVENTION

This invention relates to systems for logging earth boreholes, and particularly to systems for determining the density of the formations surrounding boreholes. More particularly, it relates to a compensated density logging system which includes means for obtaining measurements indicative of the density of the formation material at shallow and deeper distances laterally displaced from the borehole wall. Even more particularly, it relates to gamma radiation filters for the short-spaced detector which forms a part of the means for obtaining shallow density measurements.

As is well known in the well logging art, there have been developed various borehole instruments for logging the density of the formations surrounding a borehole, some of such instruments having a gamma ray source and a pair of spaced gamma ray detectors, for example, a short-spaced detector and a long-spaced detector, as is described in the U. S. Pat. No. 2,469,461, issued on May 10, 1949, to W. L. Russell and in the more recent U. S. Pat. No. 3,321,625, issued on May 23, 1967, to John S. Wahl.

Even though there have been several such instruments having dual-spaced radioactivity detectors developed in an effort to provide compensation for the effects of mud cake and borehole irregularities, the results have not been wholly satisfactory. Each prior effort has resulted in an instrument which produced long-spaced counting rates and short-spaced rates which were related to each other in a very complex way. Such relationships complicate the interpretation of the resulting logs or the computation of density from the resulting logs.

SUMMARY OF THE INVENTION

I have found that, for reasons that are not fully understood, the provision of particular kinds of filtering for the scattered gamma rays which reach the short-spaced detector results in a relatively simple relationship between the counting rates of the short-spaced and long-spaced detectors for various mud cake thicknesses. In particular, I have found that a relatively thin cadmium filter interposed between the steel instrument housing and the short-spaced detector, with no filter for the long-spaced detector, other than the steel housing, will result in the short-spaced counting rate being directly proportional to a power of the long-spaced counting rate for various thicknesses of a mud cake for a given formation and mud type, i.e., a plot on log-log graph paper of the long-spaced counting rate against the short-spaced counting rate for various mud cake thicknesses results in a straight line. Another way of saying this is that measurements made with such an instrument will result in straight ribs in the now familiar "spine-and-ribs" plot used in connection with compensated density logging.

Those skilled in this art will recognize that my finding is contrary to the teaching in the above-mentioned Wahl U.S. Pat. No. 3,321,625. Wahl teaches that, at least for the particular source-to-detector spacings used with his instrument, both detectors should be filtered and that the long-spaced detector should have a filter with approximately two- to three- times the effective absorption of the filter for the short-spaced detector.

It is therefore the primary object of this invention to provide an improved well-logging system for determining the density characteristics of the formations surrounding the borehole, wherein the short-spaced detector is provided with a filter for low energy gamma rays and no filter, other than the instrument housing, is provided for the long-spaced detector. The object of the invention is accomplished, broadly, by the provision of an appropriately selected filter for the short-spaced detector of a compensated density logging instrument which comprises a subsurface instrument including a gamma ray source, a pair of gamma ray detectors spaced at different distances from the source, and means for urging at least a portion of the instrument against the borehole wall, and surface instrumentation connected with the subsurface instrument and including an analog computer which receives signals representing the counting rates measured by the long-spaced and short-spaced detectors and generates a signal indicating the true density of the adjacent formation and recording means for recording each of said signals in correlation with the depth of the subsurface instrument in the borehole.

The novel features of the present invention are set forth in the appended claims. The present invention, both as to its organization and its manner of operation, together with other objects, advantages, and features thereof, may best be understood by way of illustration and example when taken in conjunction with the accompanying drawings in which:

DESCRIPTION OF THE PREFERRED EMBODIMENTS

Figures 1, 2:
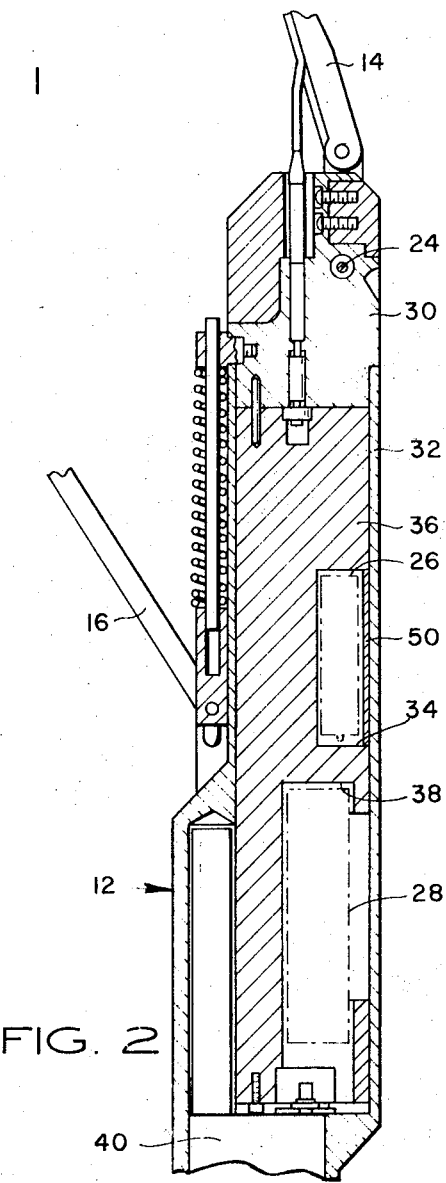
FIG. 1 shows a compensated density logging tool embodying the principles of this invention.
FIG. 2 is a side view in section of the pad portion of the subsurface unit of FIG. 1.

Referring now to FIGS. 1 and 2, the present invention is illustrated in conjunction with a compensated density logging apparatus in which a subsurface instrument 10 is provided with an extendable pad unit indicated generally at 12, the pad unit 12 being pivotally connected to instrument 10 by means of a pair of arms 14 and 16. A backup plate 18 is also pivotally connected to the instrument 10 by means of arms 20 and 22. In the preferred embodiment the arms 16 and 20 are urged outwardly under spring pressure so that the pad unit 12 and backup plate 18 are held against the sides of the borehole during the logging operation. The arms 14, 16, 20, and 22 may be actuated so that the pad unit 12 and backup plate 18 are withdrawn into the housing of instrument 10 for passage through the borehole without interference.

In the pad unit 12, a source of gamma rays 24, for example a $Cs^{137}$ source, is positioned near the top end of the unit, a first relatively short gamma ray detector 26 is positioned somewhat below the source 24 and a second, longer gamma ray detector 28 is positioned below the detector 26. The source 24 is mounted in the upper end of a shielding member 30 which is mounted in the upper end of the housing 32 of pad unit 12. Housing 32 is typically about 19/64 inch thick and is sealed to prevent contamination of the contents of the housing by any fluid which may be present in the borehole. The housing 32 also provides protection for its contents from the abrasion, etc. that pad 12 is subjected to during a logging operation.

The short-spaced detector 26 and the long-spaced detector 28 may be any suitable type of gamma ray detector but are preferably high-sensitivity Geiger counters such as those commercially available with platinum linings on the interior of metalic tubes. The short-spaced detector is positioned in a recess 34 within a main shielding member 36 and the long-spaced detector 28 is positioned within a recess 38 in the shield 36. The necessary circuitry for the detectors 26 and 28 is contained in a cartridge 40 positioned in the bottom end of housing 32 and the electrical pulse-type signals developed by the detectors 26 and 28 may also be suitably processed for application to the logging cable 42 for transmission to the earth's surface by means of suitable electronic circuitry contained in the cartridge 40. For example, this electronic circuitry may correspond to the arrangements shown in Rabson, et al. U. S. Pat. No. 3,309,657, and Wilson et al. U. S. Pat. No. 3,465,239, insofar as the development of suitable pulse-type signals and in transmission thereof to the earth's surface is concerned.

Shielding member 30 is arranged in such a fashion that the gamma rays emitted by source 24 in a direction other than toward the formations against which pad unit 12 is bearing are preferentially absorbed. Shield member 36 is preferably arranged so that the detectors 26 and 28 are preferentially sensitive to gamma rays emitted by source 24 and scattered by the formations against which pad unit 12 is bearing, i.e., gamma rays from other directions are strongly absorbed by shield 36.

Pulse-type signals which are developed by the detectors 26 and 28 in response to the detected gamma rays are suitably amplified and shaped in the circuitry contained in the cartridge 40 and are then transmitted over the logging cable 42 to the surface equipment. This surface equipment includes suitable amplifiers and pulse separation circuits so that the pulses corresponding to the output of the long-spaced detector 28 may be separated from pulses corresponding to the short-spaced detector 26. This pulse separation may, for example, be performed by means of the arrangement described in the above-identified Rabson, et al. patent. However, it will be understood that any other suitable arrangement for transmitting pulses corresponding to detectors 26 and 28 to the earth's surface and separating the same may be employed insofar as the present invention is concerned. After the two sets of pulses have been separated, they are applied to individual counting rate meters which produce output signals varying in accordance with the rates of occurrence of the corresponding pulses. This portion of the surface equipment is shown by the block 44 in FIG. 1.

The outputs of the counting rate meters are then applied to an analog computer module 46 which functions to produce a corrected density signal. The corrected density signal is then recorded on a multiple trace recorder 48 to provide a log of the true formation density as a function of depth. In some embodiments the outputs of the counting rate meters may, in addition to being sent to the computer, be also sent directly to the recorder 48 so that a record is obtained of the output of each of the detectors 26 and 28.

Those skilled in the art will have a number of circuits to choose from for the analog computer 46. For example, suitable computers are disclosed in the pending applications to Janssen and Mooring, Ser. No. 652,115 filed on July 10, 1967, and Niven, Ser. No. 684,849, filed on Nov. 21, 1967 now U.S. Pat. No. 3,583,329, each of which is assigned to the same assignee as is this invention.

Those familiar with the art will also appreciate that the output of each counting rate meter is not a linear function of density since the gamma ray absorption law is exponential in character. It is also well known that the short-spaced detector 26 is primarily sensitive to the material within a short distance of the borehole wall including the mud cake thereon and that the long-spaced detector 28 will be primarily sensitive to the material extending to a greater distance away from the borehole wall.

FIGS. 3-9 are spine-and-ribs plots of the long-spaced counting rate as a function of the short-spaced counting rate for various mud cake thicknesses, plotted on a log-log graph. A convenient exposition on spine-and-ribs plots is given in the paper by Wahl, et al. entitled "The Dual Spacing Formation Density Log" published in the *Journal of Petroleum Technology* in December 1964. The data shown in FIG. 3 was taken with a compensated density logging instrument in test pits having formations with three different densities wherein the mud cakes opposite the formations were varied. Both the mud cake thickness and density were varied. Laboratory measurements of the densities of the three formations were respectively 2.22, 2.38, and 2.65 grams per cubic centimeter. Two different mud cake densities were used, namely 1.4 grams per cubic centimeter (represented by circles on the right-hand side of the spine in each of FIGS. 3-9) and 2.5 grams per cubic centimeter (represented by the squares generally on the left-hand side of the spine in FIGS. 3-9). Three different mud cake thicknesses for each of the densities is represented in each of FIGS. 3-9, namely one-fourth inch, one-half inch, and three-quarters inch (for each mud cake density, the mud cake thickness increases with increasing distance along a rib from the spine). The ribs are thus determined by the data points extending from the thickest, high density mud mud cake down to 0 mud cake thickness (on the spine) and then extending on to the thickest low density mud cake.

Figure 3:
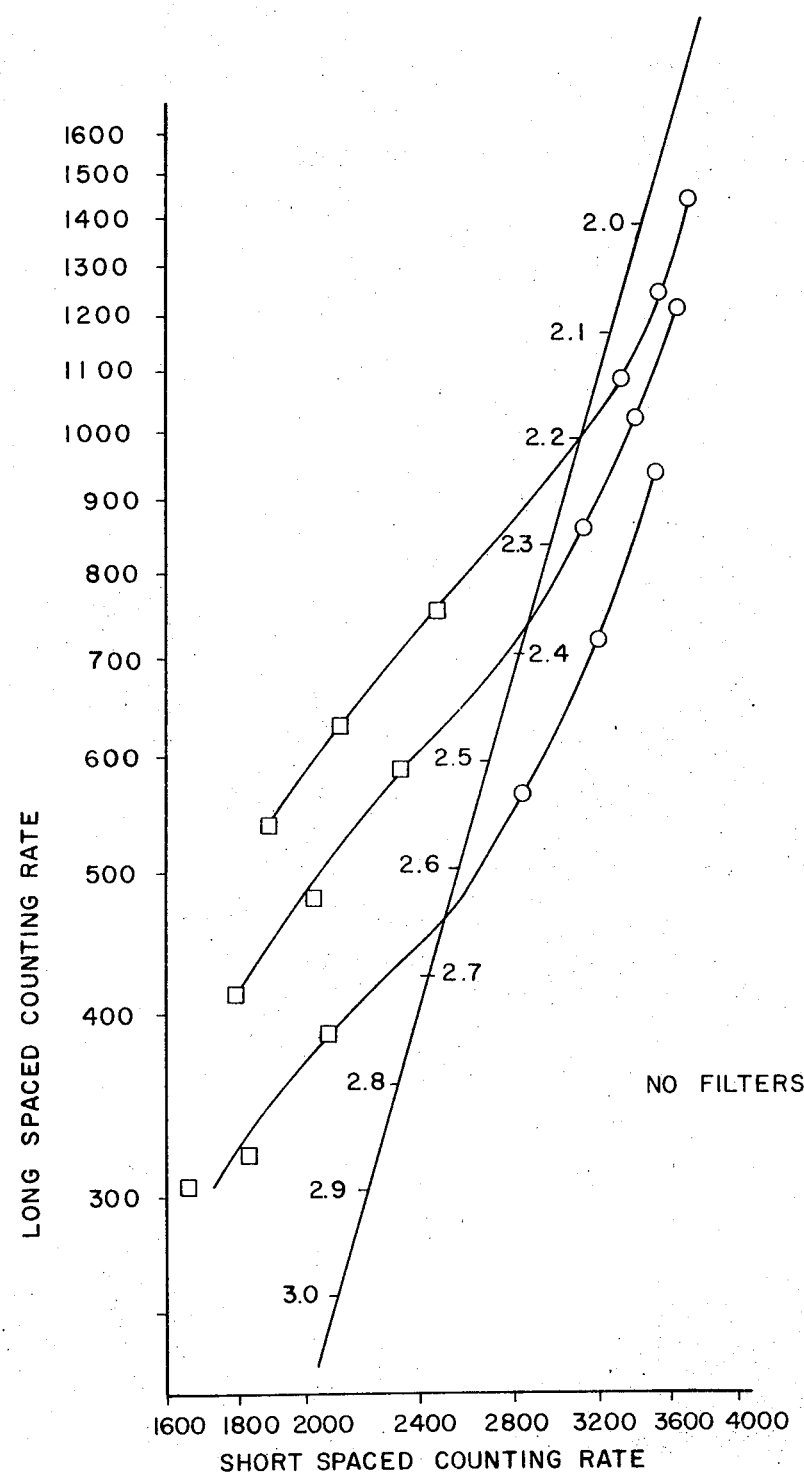
FIGS. 3, 4, and 5 are spine-and-ribs plots of measurements made with apparatus of prior art teachings.
Figure 4:
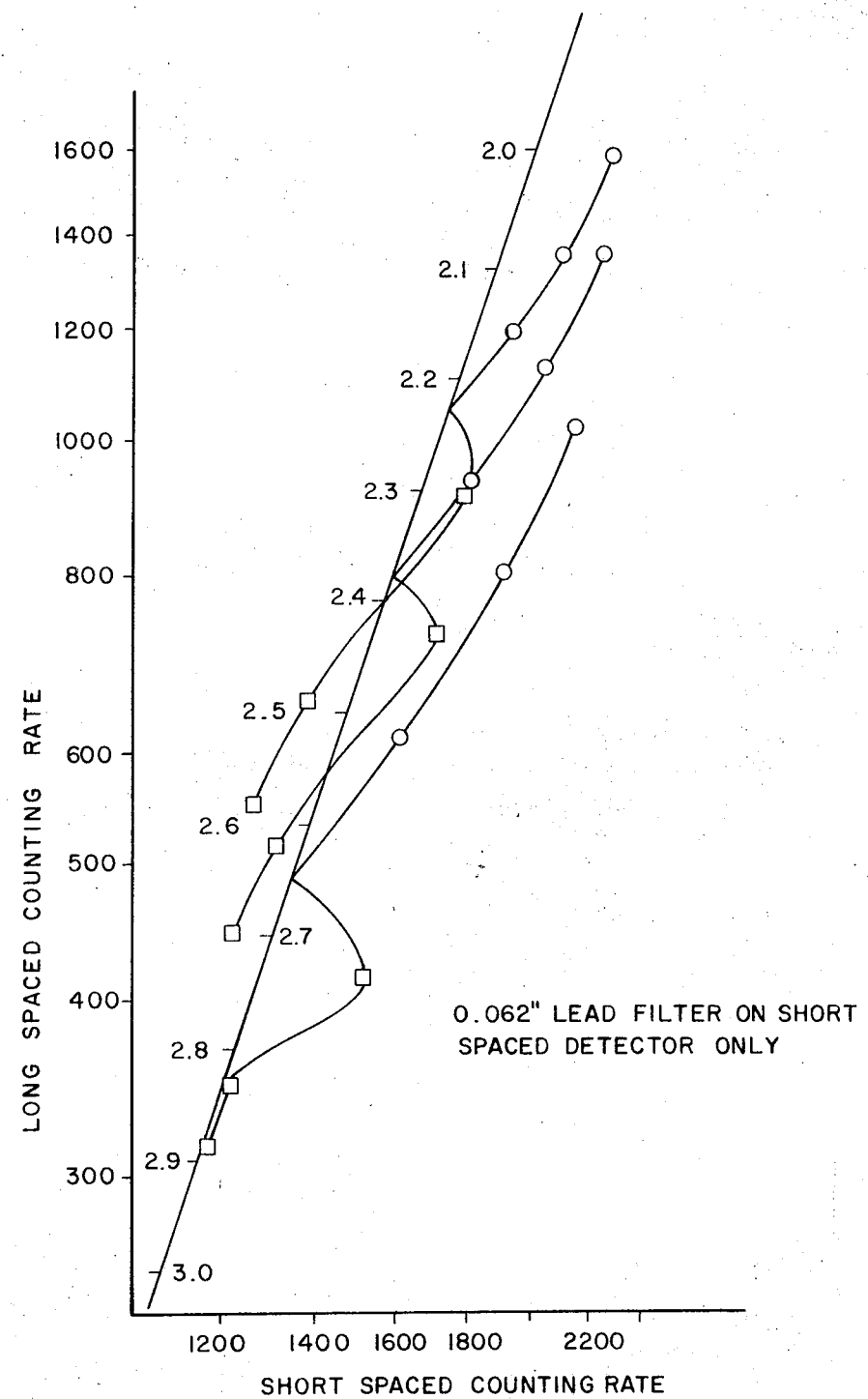
Figure 5:
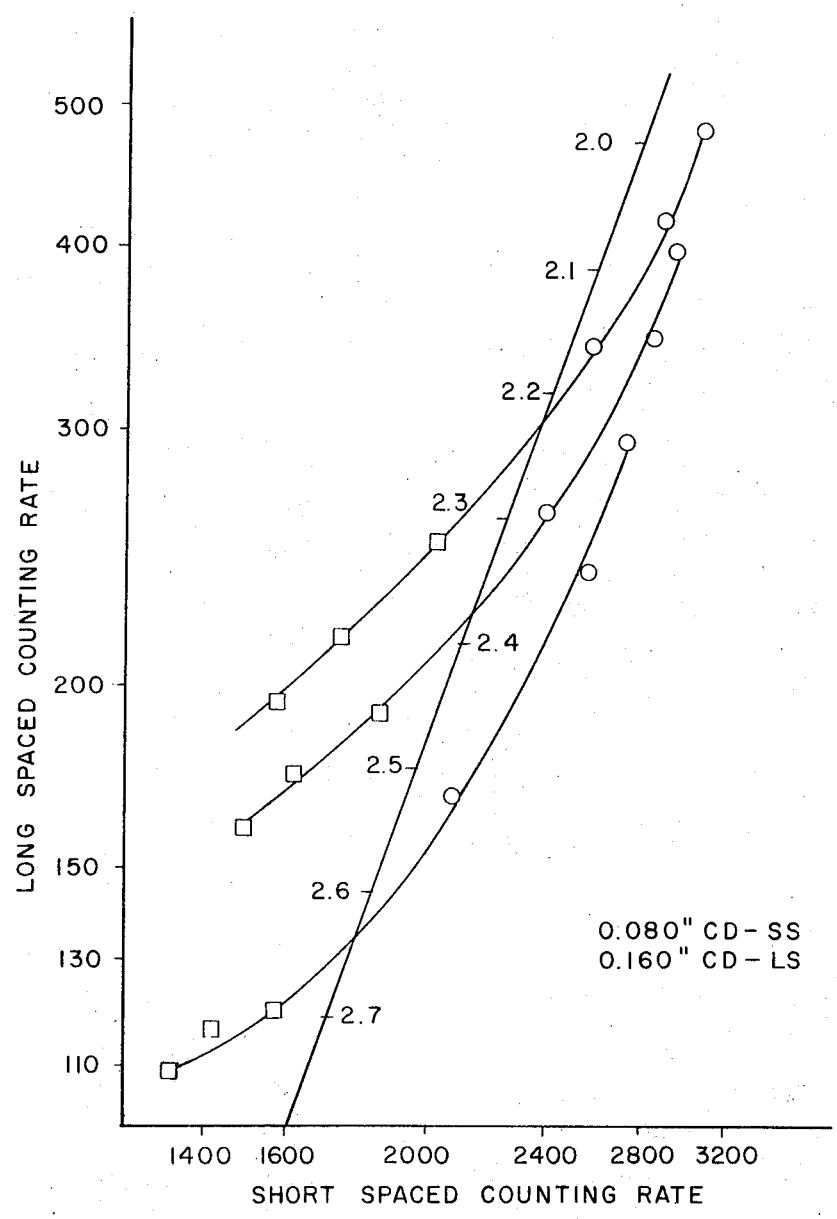

Examination of FIGS. 3-5 reveals a quite complicated relationship between the logarithms of the long-spaced and short-spaced counting rates for each of the cases illustrated, namely no filter on either detector (FIG. 3), 0.062 inch lead filter on the short-spaced detector only (FIG. 4), and 0.080 inch cadmium on the short-spaced detector and 0.160 inch cadmium on the long-spaced detector (FIG. 5). These three examples illustrate the only filtering configurations taught by the prior art of which I am aware. Since the parameter of interest to the well owner is the density of the formation without mud cake on it, i.e., the point where the rib which corresponds to the particular counting rates observed with the long-spaced and short-spaced detectors opposite the formation intersects the spine, means are provided in commercial logging systems to translate the measured point along the rib until the spine is reached so that the true formation density may be determined. This translation, of course, is accomplished by the computer 46. It is evident that only quite complicated computers could be expected to give reliable formation density measurements with spine-and-ribs plots such as those shown in FIGS. 3-5, since each rib is a complicated function of the two counting rates and the function changes from rib to rib. Since complicated computers are not economically feasible for commercial logging operations, the logging industry has generally used simpler computers to accomplish the translation (or compensation) on the basis of an assumed straight line rib. This causes errors whose magnitudes vary with formation density and mud cake thickness.

I have found that, when a relatively thin filter of particular characteristics is interposed between the short-spaced detector 26 and the steel housing 32 and no filter, other than the housing, is provided for the long-spaced detector 28, the ribs that result are straight, within experimental error, for those formations with densities and with mud cake thicknesses of interest to oil producers. For the low density mud cakes, the straight line ribs extend to mud cake thicknesses of at least one-half inch with only minor departures from the straight line for thicknesses as much as three-quarters inch. The frequently more important high density mud cakes resulting from the use of drilling muds weighted with barite show straight line relationships between the short-spaced and long-spaced detector counting rates out to mud cake thicknesses of at least three-quarter inch.

One of the required filter characteristics is that the gamma ray absorption coefficient of the filter material vary monotonously (i.e., no significant resonances) as the gamma ray energy is varied from about 150 kev to about 1 kev. Another way of saying this is that the absorption coefficient should vary smoothly and slowly over this range of gamma ray energy. I prefer the use of cadmium as a filter material but other materials are also within my invention, for example, tin, silver, copper, nickel or iron, either individually or in combinations. Filters of lead are not suitable since its gamma ray absorption coefficient is not monotonous. I have also found that, when the filter is cadmium, it should have a thickness in the range of 0.080 inch to about 0.120 inch. There is a corresponding thickness range for each of the other suitable filter materials. Such a filter is illustrated in FIG. 2 by number 50.

Figure 6:
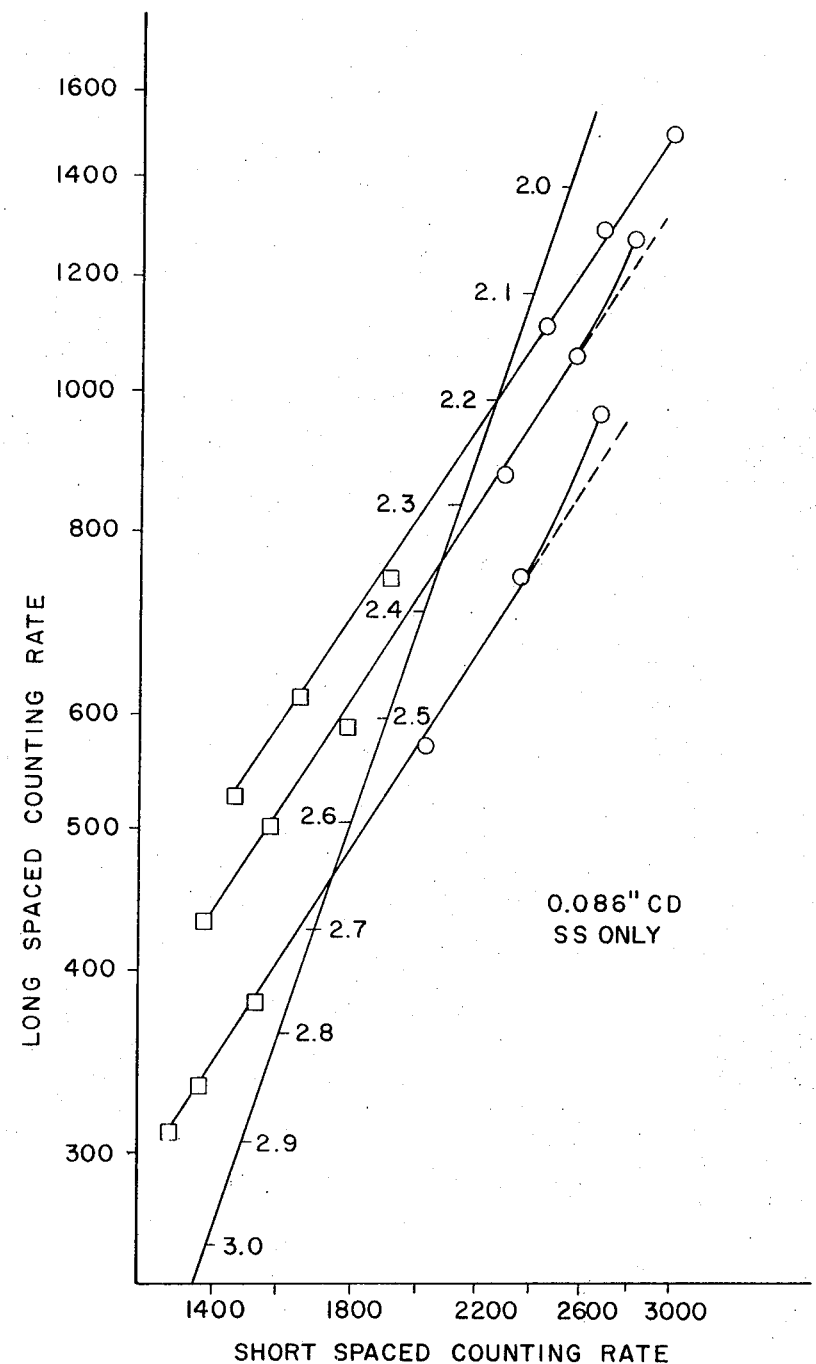
FIG. 6 is a spine-and-ribs plot of measurements made with the apparatus of this invention.

FIG. 6 is a spine-and-ribs plot of measurements taken with a 0.086 inch cadmium filter for the short-spaced detector 26 and no filter, other than the steel housing which had a thickness of about 19/64 inch for the long-spaced detector. Examination of FIG. 6 reveals that the ribs have the highly desirable straight line characteristic.

Figure 7:
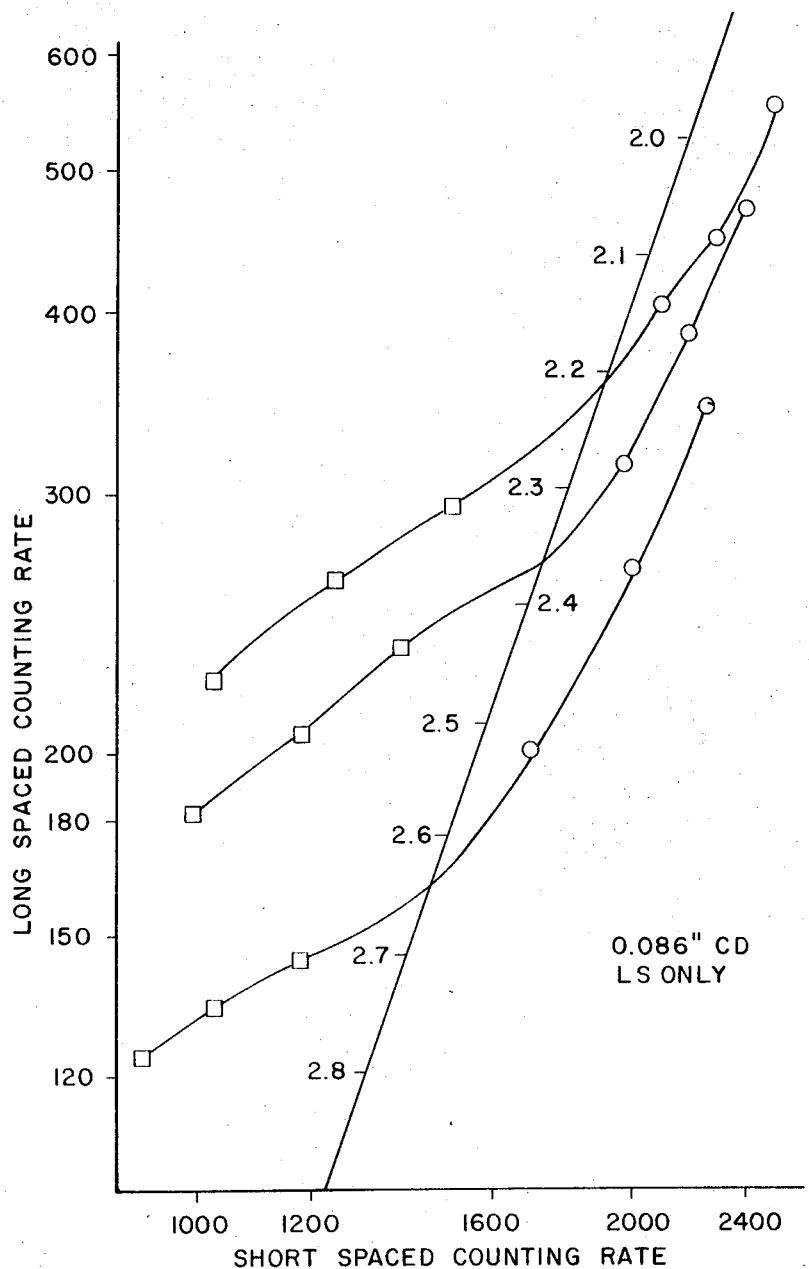
FIGS. 7, 8 and 9 are additional spine-and-ribs plots.
Figure 8:
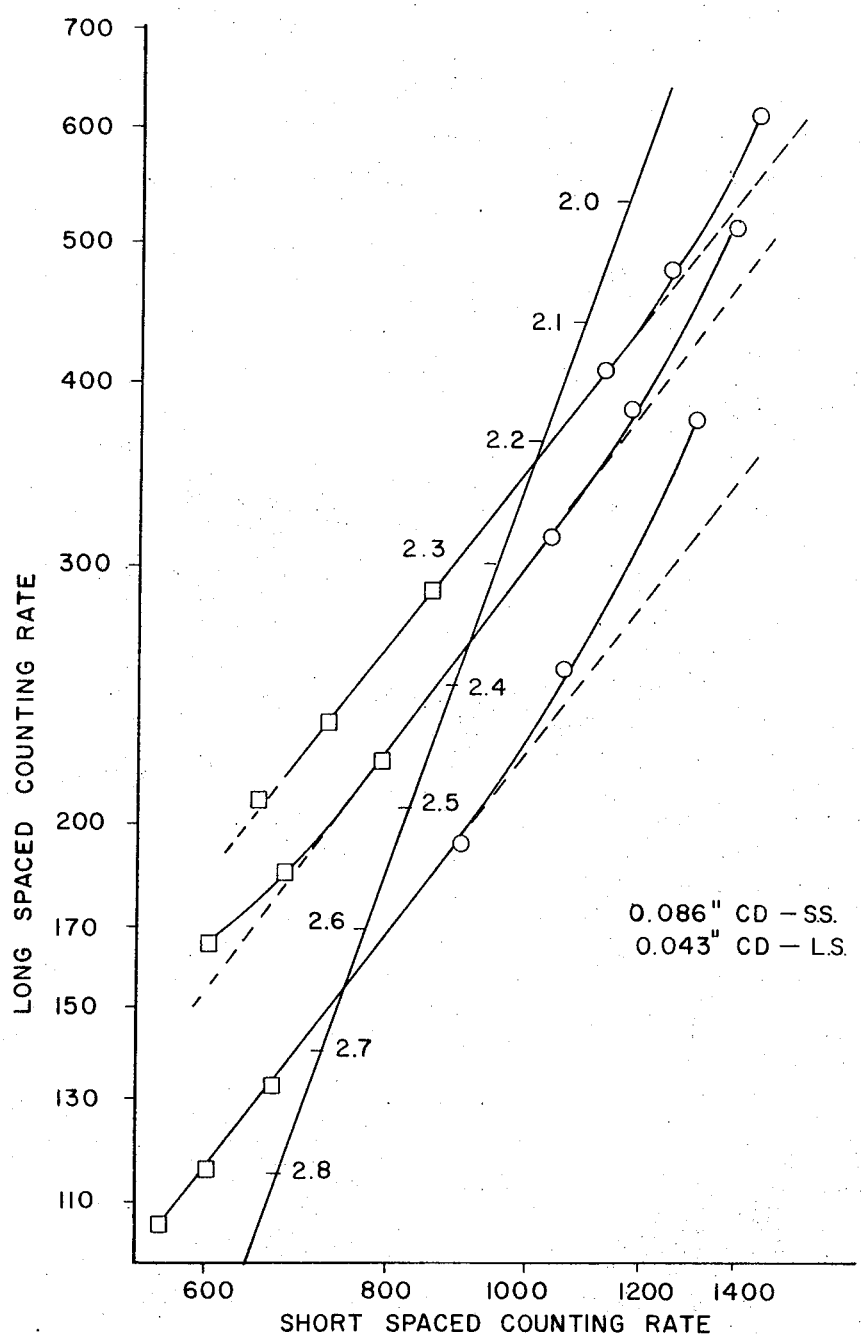
Figure 9:
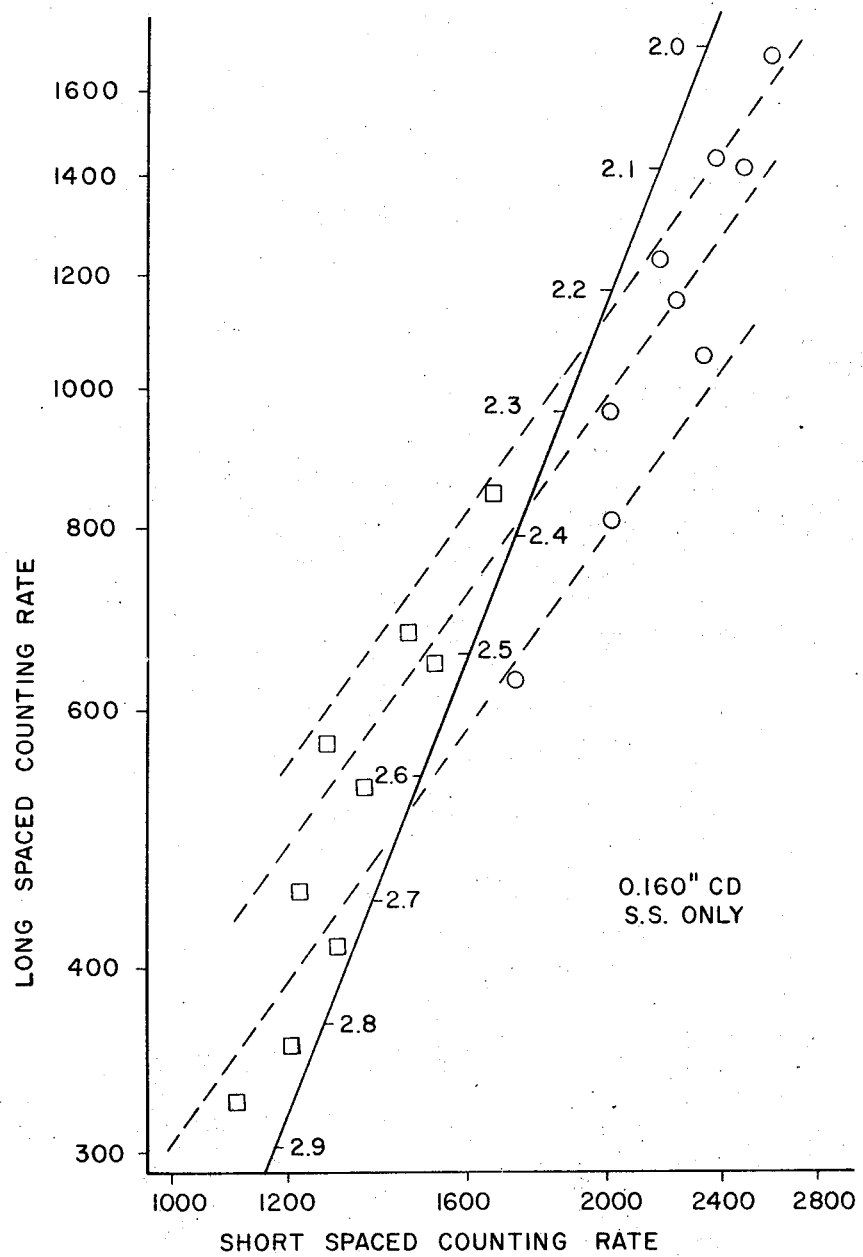

FIGS. 7, 8, and 9 are examples of spine-and-ribs plots of data I have taken to determine the above-noted characteristics of the filtering required to obtain straight line ribs. The plot of FIG. 7 shows the data taken with an instrument that had no filtering for the short-spaced detector 26 and 0.086 inch of cadmium filter for the long-spaced detector 28; it is obvious that this is an undesirable filtering configuration. The plot of FIG. 8 is of data taken with an instrument with a 0.086 inch filter of cadmium for the short-spaced detector and a 0.043 inch filter of cadmium for the long-spaced detector; here the straight line characteristic is more nearly obtained than for the instrument whose data is plotted in FIG. 5 where the long-spaced detector was more heavily filtered, but the ribs are still not suitably straight. The plot of FIG. 9 illustrates the results of having too much filtering on the short-spaced detector; here the instrument had 0.160 inch of cadmium as a filter on the short-spaced detector and no filter on the long-spaced detector.

While there have been described herein the preferred embodiments of the invention, it is to be understood that many modifications and changes can be made therefrom without departing from the spirit of the invention, and it is desired therefore to limit the scope of the invention only as set forth in the appended claims.

The embodiment of the invention in which an exclusive property or privilege is claimed are defined as follows:

1. In a compensated density logging system for determining the densities of subsurface formations which includes a radioactivity source, a short-spaced detector and a long-spaced detector contained within a steel pressure housing, the improvement which consists essentially of a filter for the short-spaced detector only composed of a material having a gamma ray absorption cross-section which is monotonous in the range of gamma ray energies from about 150 kev to about 1 kev.

2. The apparatus of claim 1 in which said filter is composed of cadmium.

3. The apparatus of claim 2 in which the cadmium filter has a thickness in the range of about 0.08 inch to 0.12 inch and the steel pressure housing has a thickness of about 0.3 inch between said filter and the formations.

4. The apparatus of claim 1 in which said filter is composed of at least one member of the class consisting of cadmium, copper, iron, nickel, silver and tin.

5. Apparatus for determining the density of formations surrounding a borehole comprising:

a subsurface instrument including a steel pressure housing adapted for traversal through a borehole;

means for urging one side of at least a portion of said instrument into engagement with the wall of the borehole;

a gamma ray source mounted in said portion of said instrument adjacent to said one side;

first gamma ray detector means mounted in said portion of said instrument and spaced a given distance from said source;

second gamma ray detector means mounted in said portion of said instrument and spaced a distance from said source which is greater than said given distance;

shielding material substantially opaque to gamma rays disposed about said detectors to make said detectors preferentially sensitive in the direction of said one side of said portion of said instrument;

shielding means substantially opaque to gamma rays disposed about said source to direct gamma rays from said source primarily toward said one side of said portion of said instrument;

said first detector including a filter adjacent said one side and said second detector being filterless;

said filter being composed of a material having a gamma ray absorption coefficient which varies smoothly and slowly in the range of gamma ray energies from about 150 kev to about 1 kev; and means for recording indications which are a function of signals derived from said detectors.

6. The apparatus of claim 5 in which said filter is composed of at least one member of the class consisting of cadmium, copper, iron, nickel, silver, and tin.

7. The apparatus of claim 5 in which said filter is composed of cadmium.

8. The apparatus of claim 7 in which the cadmium filter has a thickness in the range of about 0.08 inch to about 0.12 inch and the steel pressure housing has a thickness of about 0.3 inch.

9. The apparatus of claim 8 in which said detectors are high sensitivity Geiger counters.

* * * * *